United States Patent
Oh et al.

(10) Patent No.: US 6,303,040 B1
(45) Date of Patent: Oct. 16, 2001

(54) METHOD OF FABRICATING THERMOOPTIC TUNABLE WAVELENGTH FILTER

(75) Inventors: Min Cheol Oh; Myung Hyun Lee; Hyung Jong Lee; Joo Heon Ahn; Seon Gyu Han; Hae Geun Kim, all of Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/389,459

(22) Filed: Sep. 3, 1999

(30) Foreign Application Priority Data

Sep. 7, 1998 (KR) .................................................. 98-36776

(51) Int. Cl.[7] ...................................................... B44C 1/22

(52) U.S. Cl. .................................. 216/24; 216/41; 216/66

(58) Field of Search ................................. 216/24, 41, 66, 216/67; 385/5, 8, 10, 40, 123, 129, 130

(56) References Cited

U.S. PATENT DOCUMENTS

| | | | |
|---|---|---|---|
| 5,434,943 | 7/1995 | Dentai et al. | 385/129 |
| 5,481,402 | 1/1996 | Cheng et al. | 359/498 |
| 5,506,920 | 4/1996 | Suemura et al. | 385/25 |
| 6,210,867 | * 4/2001 | You et al. | 216/24 X |
| 6,221,565 | * 4/2001 | Jain et al. | 216/24 X |

OTHER PUBLICATIONS

"Rapidly Tunable Narrowband Wavelength Filter Using LiNbO₃ Unbalanced Mach–Zehnder Interferometers", by Ed L. Wooten et al, appearing in Journal of Lightwave Technology, vol. 14, No. 11, Nov. 1996, pp. 2530–2536.

"High–Speed Liquid Crystal Fiber Fabry–Perot Tunable Filter", by Ufei Bao et al, appearing in IEEE Photonics Technology Letters, vol. 8, No. 9, Sep. 1996, pp. 1190–1192.

"Tunable Polymer Optical Add/Drop Filter For Multiwavelength Networks", by C. Kostrzewa et al, appearing in IEEE Photonics Technology Letters, vol. 9, No. 11, Nov. 1997, pp. 1487–1489.

* cited by examiner

*Primary Examiner*—William A. Powell
(74) *Attorney, Agent, or Firm*—Antonelli, Terry, Stout & Kraus, LLP

(57) ABSTRACT

A method of fabricating a thermooptic tunable wavelength filter of optical communication systems using WDM is provided, which includes the steps of forming a polymer optical waveguide on a semiconductor substrate using a polymer material, forming a polymer Bragg grating on the optical waveguide using $O_2$ RIE and polymer spin coating, and forming a thermooptic tuning electrode over the polymer optical waveguide in which the Bragg grating is integrated. This provides the thermooptical tunable wavelength filter which has very narrow wavelength band width of transmission signal, low crosstalk with optical signals adjacent thereto, stable wavelength tuning characteristic using thermooptic effect and wide tuning ranges. Furthermore, the optical devices using the polymer optical waveguide can be fabricated with low cost. Thus, they have advantages in terms of economy and marketability.

4 Claims, 4 Drawing Sheets

METHOD OF FABRICATING THERMOOPTIC TUNABLE WAVELENGTH FILTER

BACKGROUND OF THE INVENTION

1. Field of the Invention

Figure 1A:
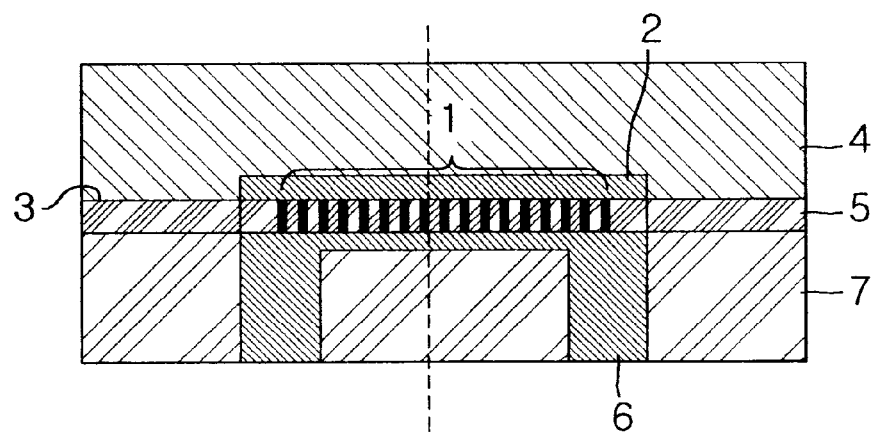

The present invention relates to a method of fabricating a thermooptic tunable wavelength filter which controls transmission wavelength according to thermooptic effect using a polymer optical waveguide and polymer Bragg grating.

2. Discussion of Related Art

A wavelength tunable filter using polymer Bragg grating has an advantage in very narrow bandwidth of transmission wavelength and its tunable wavelength characteristic using thermooptic effect produces stable operation characteristics. While optical fiber wavelength filter is widely known as a device using Bragg grating, the wavelength filter constructed in a manner that a polymer Bragg grating is integrated in a polymer optical waveguide is hardly known. The present invention firstly proposes a tunable wavelength filter which adjusts the effective refractive index of polymer optical waveguide in which the polymer Bragg grating is integrated using thermooptic effect, to control its transmission wavelength.

WDM has received considerable attention recently, because it provides an efficient way to increase the transmission capacity of optical communication systems. While previous optical communication systems transmitted optical signals using only one light source, WDM optical communication method uses multiple light sources each of which has different wavelengths to allocate each of various pieces of information to each of the different wavelengths, transmitting them. This increases the transmission capacity in linearly proportion to the number of wavelengths, reaching the level where information is transmitted in $10^{12}$ bit per second using only current techniques.

There is a method of precisely controlling the angle of bandpass filter using piezo-electric actuator to extract an optical signal having a specific wavelength, disclosed in U.S. Pat. No. 5,506,920, "Optical wavelength tunable filter" by Suemura, Yoshihiko, Japan, NEC corporation. This method provides stable operation of filter but has difficulty in realization of the filter small in size. There has been also proposed an optical filter, described in C. Kostrzewa et al., Technishe Universitat Berlin, Germany, "Tunable polymer optical add/drop filter for multiwavelength networks" in which unbalanced Mach-Zehnder interferometer is fabricated in cascade in a polymer optical waveguide to provide a tunable wavelength filter using the polymer optical waveguide, and interference characteristic is controlled using thermooptic effect to tune wavelength, providing relatively wide tunable ranges. However, it has a disadvantage in actual application due to wide band width of transmission signal.

In order to selectively extract only one wavelength desired in WDM optical communication system, it requires a tunable wavelength filter in which the band width is narrow and wavelength tuning range is sufficiently wide [M. S. Borella, J. P. Jue, D. Banerjee, B. Ramanurphy, B. Mukherlee, Proceeding of the IEEE, 85, 1274 (1997)]. The wavelength filter is needed to transmit only specific WDM optical signal and the crosstalk caused due to transmission of unwanted wavelength which is not required must be low less than −20 dB.

The wavelength filter fabricated in a manner that the Bragg grating is formed in an optical fiber has excellent characteristics, and is commercially available due to simplicity in its fabrication. However, the optical fiber Bragg grating is a passive device which cannot tune the transmission wavelength. A currently commercially available tunable wavelength filter is Fabry-Perot type device using two high reflection coated optical fibers. This can accurately mechanically adjust the distance between the optical fibers to control the wavelength transmitted through Fabry-Perot. However, the optical Fabry-Perot tunable wavelength filter has poor applicability because it is not integrated optical device.

Integrated optical waveguide tunable wavelength filters have been studied using various materials. Semiconductor optical waveguide structures include a grating-assisted codirectional coupler type filter described in Appl. Phys. Lett., 60, 980 (1992) by R. C. Alferness, L. L Buhl, U. Kohen, B. I Miller, M. G. Young, T. L. Koch, C. A. Burrus and G. Raybon, and multi-period Bragg reflector described in J. Lightwave Technol., 14, 2719 (1996) by J. P. Weber, B. Stoltz, H. Sano, M. Dasler, O. Ober and J. Walz. There has been proposed a nonbalanced Mach-Zehnder interferometer device using lithium niobate or polymer optical waveguide described in J. Lightwave Technol., 14, 2530 (1996) by E. L. Wooten, R. L. Stone, E. Miles and E. M. Bradley, and in IEEE Photon. Technol. Lett., 9, 1487 (1997) by C. Kostrzewa, R. Moosburger, G. Fischbeck, B. Schiippert, K. Pertermann. However, these devices cannot be commercially available yet due to their characteristic problems.

SUMMARY OF THE INVENTION

Accordingly, the present invention is directed to a method of fabricating a thermooptic tunable wavelength filter that substantially solves one or more of the problems due to limitations and disadvantages of the related technology.

An object of the present invention is to provide a tunable wavelength filter which can control transmission wavelength according to thermooptic effect using a polymer optical waveguide and polymer Bragg grating.

The tunable wavelength filter using a polymer Bragg grating has an advantage in that the transmission wavelength has very narrow bandwidth and its tunable wavelength characteristic using thermooptic effect produces stable operation characteristics. While optical fiber type wavelength filter is widely known as a device using Bragg grating, the wavelength filter constructed in a manner that polymer Bragg grating is integrated in polymer optical waveguide is hardly known. The present invention firstly proposes a tunable wavelength filter structure which adjusts the effective refractive index of polymer optical waveguide in which polymer Bragg grating is integrated using thermooptic effect, to control its filter wavelength.

The polymer optical waveguide device has economical advantages in simple fabrication process and cheap materials [G. Fushbeck, R. Moosburger, C. Kostrzaewa, A. Achen and K. Petermann, Electron., 33, 518 (1997); M. C. Oh, H. J. Lee, M. H. LEE, J. H. Ahn, S. G. Han, IEEE Photon. Technol., Lett., 10, 813 (1998)]. The tunable wavelength filter fabricated by integrating polymer optical waveguide and polymer Bragg grating has narrow band width, low crosstalk and flat transmission band [J. J. Pan and Y. Shi, Electron. Lett., 33, 1985(1997)]. This device can control the transmission wavelength using thermooptic effect, providing excellent characteristics more than conventional integrated optical waveguide tunable wavelength filters. Accordingly, the thermooptic tunable wavelength filter using the polymer optical waveguide and polymer grating will be used in various WDM optical signal processing systems.

To accomplish the object of the present invention, there is provided a method of fabricating a thermooptic tunable wavelength filter which includes the steps of forming a polymer optical waveguide on a semiconductor substrate using a polymer material, forming a polymer Bragg grating on the optical wave guide using $O_2$ RIE and polymer spin coating, and forming a thermooptic tuning electrode over the polymer optical waveguide in which the Bragg grating is integrated.

To accomplish the object of the present invention, there is provided a method of fabricating a thermooptic tunable wavelength filter for optical communication systems, the method comprising the steps of forming a polymer Bragg grating on a substrate using polymer coating, forming a polymer optical waveguide on the polymer Bragg grating and the substrate using a polymer material, and forming a thermooptic tuning electrode over the polymer optical waveguide in which the Bragg grating is integrated. The polymer Bragg grating is formed through the steps of coating a high refractive index polymer on the substrate, forming a grating structure with a specific period and duty ratio in a photoresist pattern using a mercury lamp and phase mask, and transferring the photoresist grating pattern to the high refractive index polymer.

The polymer optical waveguide is formed using a fluorinated polymer material to minimize the propagation loss of device around 1550 nm wavelength, mostly used in optical communication systems.

It is to be understood that both the foregoing general description and the following detailed description are exemplary and explanatory and are intended to provide further explanation of the invention as claimed.

BRIEF DESCRIPTION OF THE ATTACHED DRAWINGS

Figure 1B:
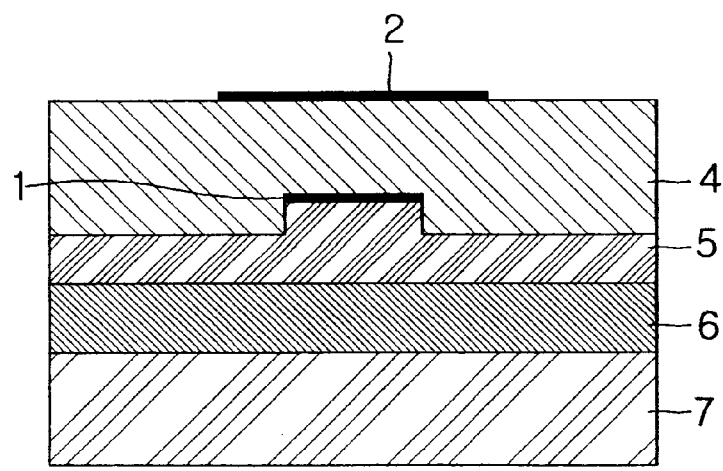
Figure 1C:
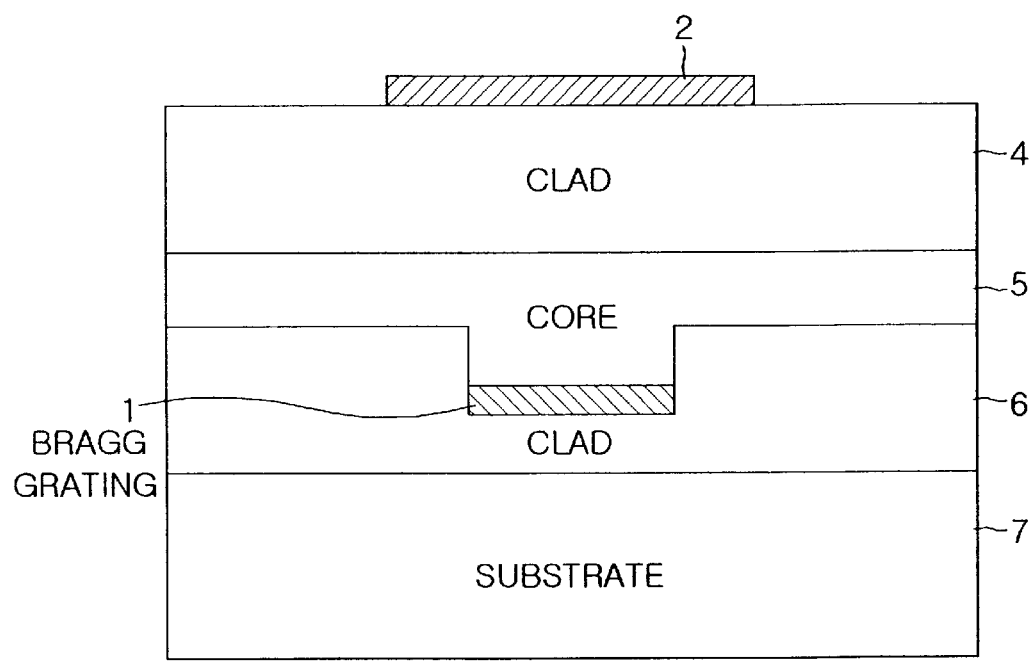
Figure 2:
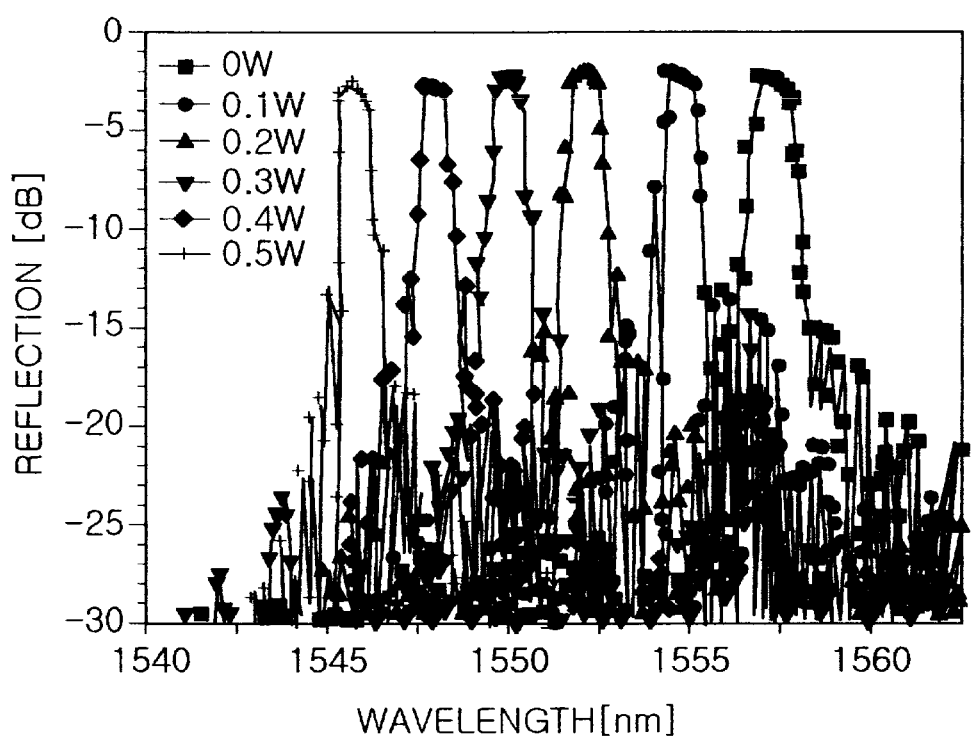
Figure 3:
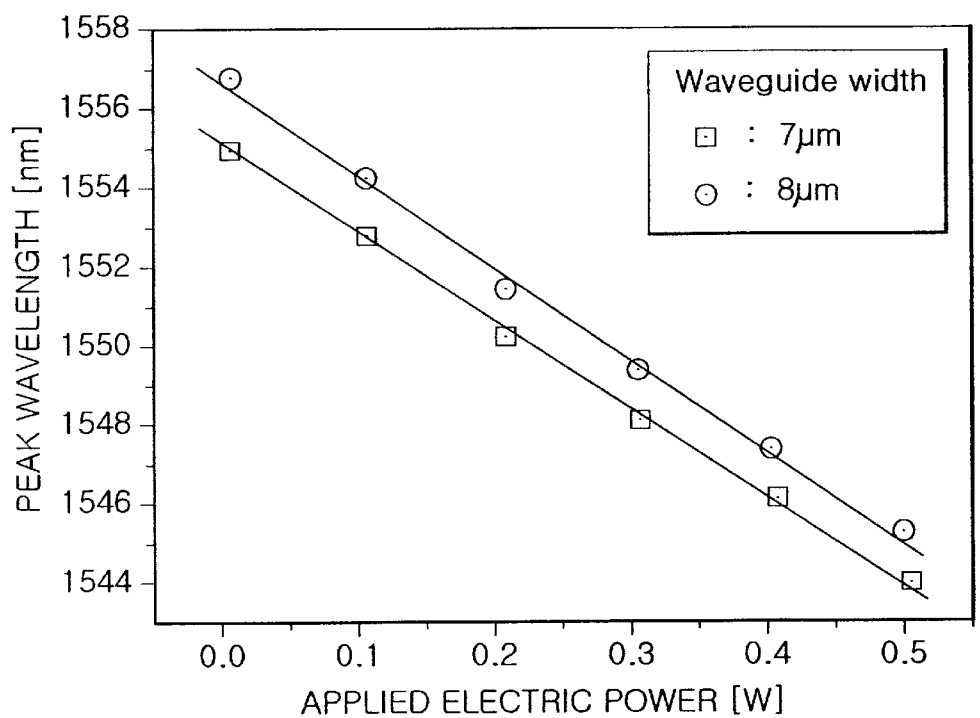

The accompanying drawings, which are included to provide a further understanding of the invention and are incorporated in and constitute a part of this specification, illustrate embodiments of the invention and together with the description serve to explain the principles of the invention:

In the drawings:

FIGS. 1A, 1B and 1C are schematic diagrams of a tunable wavelength filter to which the present invention is applied;

FIG. 2 is a reflection spectrum measured by increasing power applied to a polymer tunable wavelength filter according to the present invention by 0.1 W from 0 W to 0.5 W; and FIG. 3 shows the relationship between Bragg reflection wavelengths and applied powers measured at two polymer tunable wavelength filters whose optical waveguide widths are 7 and 8 microns respectively.

DETAILED DESCRIPTION OF PREFERRED EMBODIMENT

Reference will now be made in detail to the preferred embodiments of the present invention, examples of which are illustrated in the accompanying drawings.

FIGS. 1A, 1B, and 1C are schematic configurations of a tunable wavelength filter to which the present invention is applied. Referring to FIGS. 1A, 1B, and 1C, the tunable wavelength filter includes a substrate 7, a lower cladding layer 6 of polymer optical waveguide 3, formed on substrate 7, a core layer 5 of polymer optical waveguide, a polymer Bragg grating 1 formed over core layer 5 using a polymer with high refractive index, a upper cladding layer 4 formed on polymer Bragg grating 1, and an electrode 2 which generates heat to control the effective refractive index of the optical waveguide.

In FIGS. 1B and 1C showing the cross section of the polymer optical waveguide, substrate 7 for fabricating the optical waveguide is generally used of silicon. The polymer optical waveguide has lower cladding layer 6, core layer 5 and upper cladding layer 4. The optical refractive index of core layer 5 must be higher than those of cladding layers 4 and 6 in order to confines optical waves in core layer 5. The marginal region of core layer 5 is etched to allow its center to be relatively thick, forming a rib waveguide which confines the optical waves two-dimensionally. If required, the portion other than its center may be completely etched to form a buried waveguide.

In order to optimize the reflection efficiency of polymer Bragg grating 1 and shorten the length of device, a polymer with very high refractive index must be used. Bragg grating 1 should have a short period of below micron and be uniformly formed over a length of more than several millimeters. For this, a method of using a phase mask has received considerable attention recently [P. I. Jensen and A. Sudb, IEEE Photon. Technol. Lett., 7, 783 (1995)]. This method has an advantage of decreasing fabrication cost lower than conventional methods using laser light interference. In FIG. 1B, the Bragg grating 1 is positioned over the core layer 5 and in the upper cladding layer 4, while the Bragg grating 1 is positioned under the core layer 5 and in the lower cladding layer 6 in FIG. 1C. In FIG. 1C, the legends are written more simply, for instance, CLAD standing for lower cladding layer 6, CORE for core layer 5, and CLAD for upper cladding layer 4.

The polymer optical waveguide in which Bragg grating is integrated reflects only optical signal with narrow band width. To change the wavelength of reflective optical signal, electrode 2 is used to generate heat, as shown in FIG. 1A, to control the effective refractive index of the optical waveguide.

$$\Delta\lambda_B = 2\frac{\Lambda_g}{m}\frac{\partial n}{\partial T}\Delta T$$

When power is applied to the electrode, heat generates to raise the temperature of the core layer of optical waveguide by $\Delta T$. This varies Bragg reflection wavelength by $\Delta\lambda$, being represented as the following expression. where $\Lambda_g$ denotes the period of Bragg grating, m the order of Bragg grating and $\partial n/\partial T$ the thermooptic coefficient of polymer. The polymer advantageously has a high thermooptic coefficient of around $-1\times10^{-4}K^{-1}$, which is considerably higher than those of other materials. With the above device, to obtain wavelength tuning of about 10 nm when $\Lambda_g$=1000 nm and m=2, it requires temperature variation of 100 degrees approximately.

Low loss polymers called PFCB and FPAE are respectively used as the cladding layers and core layer of the optical waveguide, to fabricate the polymer optical waveguide tunable wavelength filter. The polymer grating is formed using a high refractive index polymer called resole. A grating structure with period of 1023 nm and duty ratio of 0.25 approximately is formed on the core layer polymer in a photoresist pattern. The resole is coated on the core layer polymer on which the grating structure is formed using a mercury lamp and phase mask, accomplishing the polymer grating. The Bragg grating generates secondary Bragg reflection near 1550 nm.

The marginal region of the core layer, other than its center, is etched using $O_2$, RIE, to form a channel optical waveguide. PFCB is coated on the etched channel optical waveguide, forming the optical waveguide structure. The electrode for thermooptic wavelength tuning is formed in such a manner that Cr—Au is evaporated by 10–60 nm and patterned to be shaped in width of 40 micron and length of 5 mm. The length of the completed device is about 10 mm and length of Bragg grating is 5 mm.

To measure the tuning characteristics of the device fabricated, TE polarized tunable laser light source was used. The output light of the tunable laser coupled into the device through polarization maintenance optical fiber, and circulator was used for detecting reflective ray of light. FIG. 2 shows the measured tunable wavelength filter characteristics. In FIG. 2, reflection spectra are measured while applied power increase by 0.1 W from 0 W to 0.5 W. Over the variation of applied power, the reflection signal peak is varied to 11 nm approximately, 3-dB band width is varied from 1.2 nm to 0.8 nm, and insertion loss of tuning filter is maintained in 3–4 dB. FIG. 3 shows the relationship between Bragg reflection wavelengths and applied powers measured at two polymer tunable wavelength filters whose optical waveguide widths are 7 and 8 microns respectively. It can be confirmed that the location of reflection peak is changed in linearly proportion to the applied power.

As described above, the present invention provides the thermooptic tunable wavelength filter using the polymer optical waveguide Bragg grating which has very narrow wavelength band width of transmission signal, low crosstalk with optical signals adjacent thereto, stable wavelength tuning characteristic using thermooptic effect and wide tuning ranges. The optical devices using the polymer optical waveguide can be fabricated with low cost. Thus, they have advantages in terms of economy and marketability.

It will be apparent to those skilled in the art that various modifications and variations can be made in the method of fabricating a thermooptic tunable wavelength filter of the present invention without departing from the spirit or scope of the invention. Thus, it is intended that the present invention cover the modifications and variations of this invention provided they come within the scope of the appended claims and their equivalents.

What is claimed is:

1. A method of fabricating a thermooptic tunable wavelength filter for optical communication systems, the method comprising the steps of:

forming a polymer optical waveguide on a substrate using a polymer material;

forming a polymer Bragg grating on the optical waveguide using etching and polymer coating; and forming a thermooptic tuning electrode over the polymer optical waveguide in which the Bragg grating is integrated.

2. The method as claimed in claim 1, the polymer Bragg grating is formed through the steps of:

forming a grating structure with a specific period and duty ratio in a photoresist pattern using a mercury lamp and phase mask;

transferring the photoresist grating pattern to a core layer using etching; and coating a high refractive index polymer on the core layer on which the grating structure is formed.

3. A method of fabricating a thermooptic tunable wavelength filter for optical communication systems, the method comprising the steps of:

forming a polymer Bragg grating on a substrate using polymer coating;

forming a polymer optical waveguide on the polymer Bragg grating and the substrate using a polymer material; and forming a thermooptic tuning electrode over the polymer optical waveguide in which the Bragg grating is integrated.

4. The method as claimed in claim 3, the polymer Bragg grating is formed through the steps of:

coating a high refractive index polymer on the substrate;

forming a grating structure with a specific period and duty ratio in a photoresist pattern using a mercury lamp and phase mask; and transferring the photoresist grating pattern to the high refractive index polymer.

* * * * *